(12) United States Patent
Jang et al.

(10) Patent No.: US 11,066,598 B2
(45) Date of Patent: Jul. 20, 2021

(54) DYE-SENSITIZED UPCONVERSION NANOPHOSPHOR

(71) Applicant: KOREA INSTITUTE OF SCIENCE AND TECHNOLOGY, Seoul (KR)

(72) Inventors: Ho Seong Jang, Seoul (KR); Joon Soo Han, Seoul (KR); A Ra Hong, Seoul (KR); So Hye Cho, Seoul (KR); Seung Yong Lee, Seoul (KR); Hyung Duk Ko, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 294 days.

(21) Appl. No.: 16/293,960

(22) Filed: Mar. 6, 2019

(65) Prior Publication Data

US 2020/0079994 A1 Mar. 12, 2020

(30) Foreign Application Priority Data

Sep. 7, 2018 (KR) .................. 10-2018-0107169

(51) Int. Cl.
*C09K 11/06* (2006.01)
*C09K 11/77* (2006.01)
*G06Q 30/00* (2012.01)

(52) U.S. Cl.
CPC .......... *C09K 11/06* (2013.01); *C09K 11/7773* (2013.01); *C09K 11/7791* (2013.01); *G06Q 30/0185* (2013.01)

(58) Field of Classification Search
CPC . C09K 11/06; C09K 11/7773; C09K 11/7791; G06Q 30/0185
See application file for complete search history.

(56) References Cited

FOREIGN PATENT DOCUMENTS

CN 105505374 * 4/2016

OTHER PUBLICATIONS

Feifei Zhao et al., 'Huge enhancement of upconversion luminescence by dye/Nd3+ sensitization of quenching-shield sandwich structured upconversion nanocrystals under 808 nm excitation', Dalton Transaction, 2017, p. 16180-16189, vol. 46.*
Guanying Chen et al., "Energy-Cascaded Upconversion in an Organic Dye-Sensitized Core/Shell Fluoride Nanocrystal", Nano Letters, 2015. DP-7400-7407. vol. 15.*
Translation for CN 105505374, Apr. 20, 2016.*
Guanying Chen et al., "Energy-Cascaded Upconversion in an Organic Dye-Sensitized Core/Shell Fluoride Nanocrystal", Nano Letters, 2015, pp. 7400-7407, vol. 15.
Feifei Zhao et al., "Huge enhancement of upconversion luminescence by dye/$Nd^{3+}$ sensitization of quenching-shield sandwich structured upconversion nanocrystals under 808 nm excitation", Dalton Transaction, 2017, pp. 16180-16189, vol. 46.
Wenqiang Zou et al., "Broadband dye-sensitized upconversion of near-infrared light", Nature Photonics, Aug. 2012, pp. 560-564, vol. 6.

* cited by examiner

*Primary Examiner* — C Melissa Koslow
(74) *Attorney, Agent, or Firm* — Rabin & Berdo, P.C.

(57) ABSTRACT

Provided is a dye-sensitized upconversion nanophosphor including a core, a first shell surrounding at least part of the core, and an organic dye bonded to a surface of the nanophosphor which has an absorption band ranging from 650 nm to 850 nm and which is excited in a near-infrared region to emit visible light. The dye-sensitized upconversion nanophosphor may be included in a display apparatus, a fluorescent contrast agent, or an anti-counterfeiting code. The organic dye may be an IR-808 dye.

17 Claims, 16 Drawing Sheets

DYE-SENSITIZED UPCONVERSION NANOPHOSPHOR

CROSS-REFERENCE TO RELATED PATENT APPLICATION

This application claims the benefit of Korean Patent Application No. 10-2018-0107169, filed on Sep. 7, 2018, in the Korean Intellectual Property Office, the disclosure of which is incorporated herein in its entirety by reference.

BACKGROUND

1. Field

The present invention relates to an upconversion nanophosphor and a method of synthesizing the same and, more particularly, to a dye-sensitized upconversion nanophosphor and a method of synthesizing the same.

2. Description of the Related Art

An upconversion nanophosphor is a material absorbing infrared light and emitting ultraviolet and visible light and includes particles having a small diameter equal to or less than 100 nm. The upconversion nanophosphor is doped with a dopant capable of absorbing infrared light, and activator ions capable of determining a color of emitted light. Most upconversion nanophosphors use $Yb^{3+}$ capable of absorbing light of a 980-nm region and $Nd^{3+}$ capable of absorbing light of an 800-nm region. However, $Yb^{3+}$ and $Nd^{3+}$ have narrow absorption bands and low absorbance values at near-infrared region. Since strong absorption of near infrared light by the upconversion nanophosphor is required for a high upconversion photoluminescence intensity, a nanophosphor doped with only $Yb^{3+}$ or $Nd^{3+}$ may not emit bright visible light under excitation with infrared light. It is reported that an organic dye such as IR-806 has a wide absorption band and a high absorbance in a near-infrared region and intense green light is emitted from the dye-bonded upconversion nanophosphor under infrared excitation condition when the IR-806 dye is bonded to a $NaYF_4$:Yb, Er upconversion nanophosphor [Nature Photonics vol. 6, 560-563(2012)]. However, since energy of infrared light absorbed by the IR-806 dye may not be efficiently transferred to $Yb^{3+}$ ions or $Er^{3+}$ ions, an increase in the photoluminescence intensity of the upconversion nanophosphor is restrictive. Therefore, employment of a structure in which energy absorbed by the organic dye is efficiently transferred to an activator (e.g., erbium (Er), thulium (Tm), or holmium (Ho)) doped into the nanophosphor is required. That is, a large increase in the photoluminescence intensity of the upconversion nanophosphor is expected when the structure of the nanophosphor is controlled and thus energy of infrared light absorbed by the dye is efficiently transferred to the activator doped into the nanophosphor, and an improvement in the performance of a sensor, a imaging contrast agent, a display, or the like using infrared light as a light source is expected when the upconversion nanophosphor having the organic dye bonded thereto is applied thereto.

SUMMARY

The present invention provides dye-sensitized upconversion nanophosphors capable of emitting blue, green, and red light at a high intensity under 800-nm infrared light excitation, by bonding an organic dye capable of absorbing 800-nm near-infrared light, to the surface of a nanophosphor, synthesizing a core/shell nanophosphor, and doping $Nd^{3+}$ and $Yb^{3+}$ on a shell to efficiently transfer energy of 800-nm infrared light absorbed by the organic dye, to an activator doped into a core and emitting light. However, the scope of the present invention is not limited thereto.

According to an aspect of the present invention, there is provided an upconversion nanophosphor.

An upconversion nanophosphor according to an embodiment of the present invention includes a fluoride-based nanoparticle doped with $Yb^{3+}$, $Er^{3+}$ or $Tm^{3+}$ and expressed by Chemical Formula 1.

$$LiGd_xL_{1-x-y-z}F_4:Yb^{3+}_y,Er^{3+}_z \quad \text{[Chemical Formula 1]}$$

In Chemical Formula 1, x denotes a real number satisfying 0≤x≤0.6, y denotes a real number satisfying 0≤y≤0.98, z denotes a real number satisfying 0<z≤0.2, and L denotes any one selected from among rare-earth elements. The rare-earth element may include any one selected from the group consisting of yttrium (Y), lanthanum (La), cerium (Ce), praseodymium (Pr), neodymium (Nd), promethium (Pm), samarium (Sm), europium (Eu), terbium (Tb), dysprosium (Dy), holmium (Ho), thulium (Tm), lutetium (Lu), and a combination thereof. In this case, x, y, and z are selected in a range satisfying 0<x+y+z≤1.

The nanophosphor may include a core including the nanoparticle, and a shell positioned on the surface of the core, and the shell may be made of a compound expressed by Chemical Formula 2.

$$LiY_{1-p-q-r}M_rF_4:Nd^{3+}_p,Yb^{3+}_q \quad \text{[Chemical Formula 2]}$$

In Chemical Formula 2, p denotes a real number satisfying 0<p≤1, q denotes a real number satisfying 0≤q≤0.5, and r denotes a real number satisfying 0≤r≤1. In this case, p, q, and r are selected in a range satisfying 0<p+q+r≤1. M denotes any one selected from the group consisting of La, gadolinium (Gd), Ce, Pr, Pm, Sm, Eu, Tb, Dy, Ho, erbium (Er), Tm, Lu, and a combination thereof.

The nanophosphor includes the core and the shell, the dopant $Nd^{3+}$ absorbs 800-nm infrared light and transfers the absorbed energy to $Yb^{3+}$, and the co-dopant $Yb^{3+}$ transfers the absorbed energy to an activator of the core, thereby showing an emission peak in a visible light region.

$$LiGd_xN_{1-x-y-z}F_4:Yb^{3+}_y,Tm^{3+}_z \quad \text{[Chemical Formula 3]}$$

In Chemical Formula 3, x denotes a real number satisfying 0≤x≤0.6, y denotes a real number satisfying 0≤y≤0.98, z denotes a real number satisfying 0<z≤0.2, and N denotes any one selected from among rare-earth elements. The rare-earth element may include any one selected from the group consisting of Y, La, Ce, Pr, Nd, Pm, Sm, Eu, Tb, Dy, Ho, Er, Lu, and a combination thereof. In this case, x, y, and z are selected in a range satisfying 0<x+y+1.

$$LiY_{1-p-q-r}Q_rF_4:Nd^{3+}_p,Yb^{3+}_q \quad \text{[Chemical Formula 4]}$$

In Chemical Formula 4, p denotes a real number satisfying 0<p≤1, q denotes a real number satisfying 0≤q≤0.5, and r denotes a real number satisfying 0≤r≤1. In this case, p, q, and r are selected in a range satisfying 0<p+q+r≤1. Q denotes any one selected from the group consisting of La, Gd, Ce, Pr, Pm, Sm, Eu, Tb, Dy, Ho, Er, Tm, Lu, and a combination thereof.

The nanophosphor includes the core and the shell, the dopant $Nd^{3+}$ absorbs 800-nm infrared light and transfers the absorbed energy to $Yb^{3+}$, and the co-dopant $Yb^{3+}$ transfers the absorbed energy to an activator doped into the core, thereby showing an emission peak in a visible light region.

Alternatively, an upconversion nanophosphor according to an embodiment of the present invention includes a fluoride-based nanoparticle co-doped with $Yb^{3+}$, $Ho^{3+}$, and $Ce^{3+}$ and expressed by Chemical Formula 5.

$$NaGd_{1-a-b-c-d}R_dF_4:Yb^{3+}{}_a,Ho^{3+}{}_b,Ce^{3+}{}_c \qquad \text{[Chemical Formula 5]}$$

In Chemical Formula 5, a denotes a real number satisfying 0≤a≤1, b denotes a real number satisfying 0<b≤0.2, c denotes a real number satisfying 0≤c≤0.6, and d denotes a real number satisfying 0≤d≤1. In this case, a, b, c, and d are selected in a range satisfying 0<a+b+c+d≤1. R denotes any one selected from the group consisting of Y, La, Pr, Pm, Sm, Eu, Tb, Dy, Er, Tm, Lu, and a combination thereof.

The nanophosphor may include a core including the nanoparticle, and a shell positioned on the surface of the core, and the shell may be made of a compound expressed by Chemical Formula 6.

$$NaGd_{1-p-q-r}T_rF_4:Nd^{3+}{}_p,Yb^{3+}{}_q \qquad \text{[Chemical Formula 6]}$$

In Chemical Formula 6, p denotes a real number satisfying 0<p≤1, q denotes a real number satisfying 0≤q≤0.5, and r denotes a real number satisfying 0≤r≤1. In this case, p, q, and r are selected in a range satisfying 0<p+q+r≤1. T denotes any one selected from the group consisting of Y, La, Ce, Pr, Pm, Sm, Eu, Tb, Dy, Ho, Er, Tm, Lu, and a combination thereof.

The nanophosphor includes the core and the shell, the co-dopant $Nd^{3+}$ absorbs infrared light, and $Yb^{3+}$ transfers the absorbed energy to $Ho^{3+}$, thereby showing an emission peak in a red light region.

The nanophosphor may include a core/shell including the nanoparticle, and a second shell positioned on the surface of the core/shell, and the second shell may be made of a compound expressed by Chemical Formula 7.

$$NaGd_{1-p-q}X_qF_4:Nd^{3+}{}_p \qquad \text{[Chemical Formula 7]}$$

In Chemical Formula 7, p denotes a real number satisfying 0≤p≤1, and q denotes a real number satisfying 0≤q≤1. In this case, p and q are selected in a range satisfying 0≤p+q≤1. X denotes any one selected from the group consisting of Y, La, Ce, Pr, Pm, Sm, Eu, Tb, Dy, Ho, Yb, Er, Tm, Lu, and a combination thereof.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figure 1:
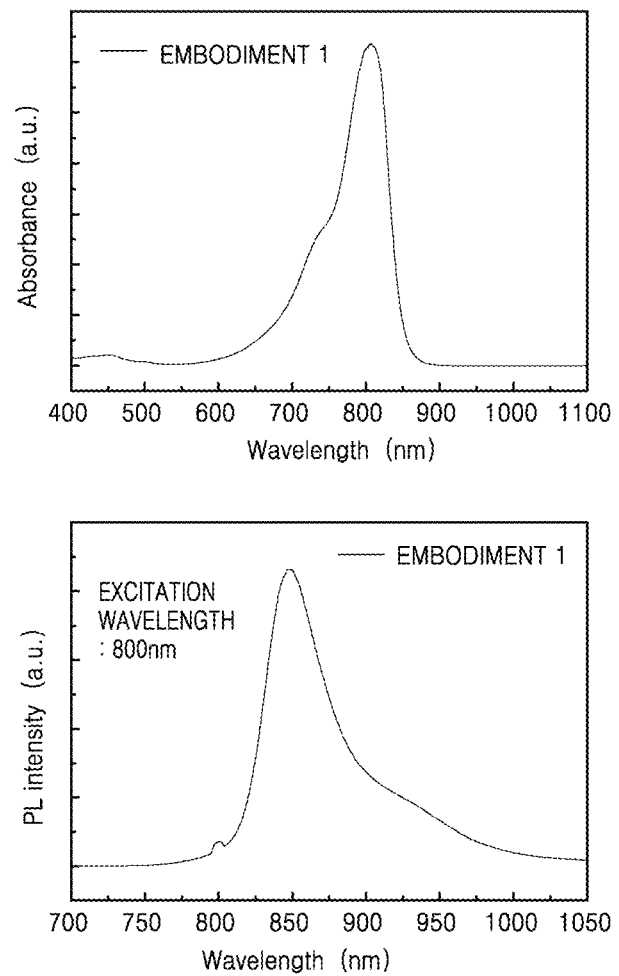
FIG. 1 illustrates an absorption spectrum of an organic dye according to an embodiment of the present invention, and an emission spectrum thereof under 800-nm infrared light excitation.

Hereinafter, dye-sensitized upconversion nanophosphors according to embodiments of the present invention will be described with reference to the attached drawings. In addition, upconversion nanophosphors emitting green, blue, and red light under 980-nm and 800-nm infrared light excitation will be also described. An organic dye of the present invention has a wide and intense absorption band in an 800-nm wavelength region and thus may effectively absorb 800-nm infrared light. An upconversion nanophosphor of the present invention has a core/shell or core/shell/shell structure in which cores are doped with a sensitizer capable of absorbing 980-nm infrared light and an activator capable of emitting visible light, and shells are doped with a sensitizer capable of absorbing 800-nm infrared light. In a dye-sensitized upconversion nanophosphor, a dye sensitized upconversion nanophosphor effectively absorbs 800-nm near-infrared light and the absorbed energy is transferred to dopant ions doped into the first and the second shells surrounding cores. Since energy is transferred from sensitizer ions doped into shells to activator ions doped into cores through sensitizer ions doped into the cores, visible light is effectively emitted.

An upconversion nanophosphor according to an embodiment of the present invention includes a fluoride-based nanoparticle doped with $Yb^{3+}$, $Er^{3+}$ or $Tm^{3+}$ and expressed by Chemical Formula 1.

[Chemical Formula 1]

In Chemical Formula 1, x denotes a real number satisfying $0 \leq x \leq 0.6$, y denotes a real number satisfying $0 \leq y \leq 0.98$, z denotes a real number satisfying $0 < z \leq 0.2$, and L denotes any one selected from among rare-earth elements. The rare-earth element may include any one selected from the group consisting of yttrium (Y), lanthanum (La), cerium (Ce), praseodymium (Pr), neodymium (Nd), promethium (Pm), samarium (Sm), europium (Eu), terbium (Tb), dysprosium (Dy), holmium (Ho), thulium (Tm), lutetium (Lu), and a combination thereof. In this case, x, y, and z are selected in a range satisfying $0 < x+y+z \leq 1$.

The nanophosphor may include a core including the nanoparticle, and a shell positioned on the surface of the core, and the shell may be made of a compound expressed by Chemical Formula 2.

[Chemical Formula 2]

In Chemical Formula 2, p denotes a real number satisfying $0 < p \leq 1$, q denotes a real number satisfying $0 \leq q \leq 0.5$, and r denotes a real number satisfying $0 \leq r \leq 1$. In this case, p, q, and r are selected in a range satisfying $0 < p+q+r \leq 1$. M denotes any one selected from the group consisting of La, gadolinium (Gd), Ce, Pr, Pm, Sm, Eu, Tb, Dy, Ho, erbium (Er), Tm, Lu, and a combination thereof.

The nanophosphor includes the core and the shell, the dopant $Nd^{3+}$ absorbs 800-nm infrared light and transfers the absorbed energy to $Yb^{3+}$, and the co-dopant $Yb^{3+}$ transfers the absorbed energy to an activator of the core, thereby showing an emission peak in a visible light region.

[Chemical Formula 3]

In Chemical Formula 3, x denotes a real number satisfying $0 \leq x \leq 0.6$, y denotes a real number satisfying $0 \leq y \leq 0.98$, z denotes a real number satisfying $0 < z \leq 0.2$, and N denotes any one selected from among rare-earth elements. The rare-earth element may include any one selected from the group consisting of Y, La, Ce, Pr, Nd, Pm, Sm, Eu, Tb, Dy, Ho, Er, Lu, and a combination thereof. In this case, x, y, and z are selected in a range satisfying $0 < x+y+z \leq 1$.

[Chemical Formula 4]

In Chemical Formula 4, p denotes a real number satisfying $0 < p \leq 1$, q denotes a real number satisfying $0 \leq q \leq 0.5$, and r denotes a real number satisfying $0 \leq r \leq 1$. In this case, p, q, and r are selected in a range satisfying $0 < p+q+r \leq 1$. Q denotes any one selected from the group consisting of La, Gd, Ce, Pr, Pm, Sm, Eu, Tb, Dy, Ho, Er, Tm, Lu, and a combination thereof.

The nanophosphor includes the core and the shell, the dopant $Nd^{3+}$ absorbs 800-nm infrared light and transfers the absorbed energy to $Yb^{3+}$, and the co-dopant $Yb^{3+}$ transfers the absorbed energy to an activator doped into the core, thereby showing an emission peak in a visible light region.

Alternatively, an upconversion nanophosphor according to an embodiment of the present invention includes a fluoride-based nanoparticle co-doped with $Yb^{3+}$, $Ho^{3+}$, and $Ce^{3+}$ and expressed by Chemical Formula 5.

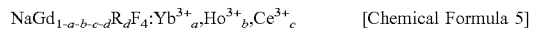

[Chemical Formula 5]

In Chemical Formula 5, a denotes a real number satisfying $0 \leq a \leq 1$, b denotes a real number satisfying $0 < b \leq 0.2$, c denotes a real number satisfying $0 \leq c \leq 0.6$, and d denotes a real number satisfying $0 \leq d \leq 1$. In this case, a, b, c, and d are selected in a range satisfying $0 < a+b+c+d \leq 1$. R denotes any one selected from the group consisting of Y, La, Pr, Pm, Sm, Eu, Tb, Dy, Er, Tm, Lu, and a combination thereof.

The nanophosphor may include a core including the nanoparticle, and a shell positioned on the surface of the core, and the shell may be made of a compound expressed by Chemical Formula 6.

[Chemical Formula 6]

In Chemical Formula 6, p denotes a real number satisfying $0 < p \leq 1$, q denotes a real number satisfying $0 \leq q \leq 0.5$, and r denotes a real number satisfying $0 \leq r \leq 1$. In this case, p, q, and r are selected in a range satisfying $0 < p+q+r \leq 1$. T denotes any one selected from the group consisting of Y, La, Ce, Pr, Pm, Sm, Eu, Tb, Dy, Ho, Er, Tm, Lu, and a combination thereof.

The nanophosphor includes the core and the shell, the co-dopant $Nd^{3+}$ absorbs infrared light, and $Yb^{3+}$ transfers the absorbed energy to $Ho^{3+}$, thereby showing an emission peak in a red light region.

The nanophosphor may include a core/shell including the nanoparticle, and a second shell positioned on the surface of the core/shell, and the second shell may be made of a compound expressed by Chemical Formula 7.

[Chemical Formula 7]

In Chemical Formula 7, p denotes a real number satisfying $0 \leq p \leq 1$, and q denotes a real number satisfying $0 \leq q \leq 1$. In this case, p and q are selected in a range satisfying $0 \leq p+q \leq 1$. X denotes any one selected from the group consisting of Y, La, Ce, Pr, Pm, Sm, Eu, Tb, Dy, Ho, Yb, Er, Tm, Lu, and a combination thereof.

In brief, an upconversion nanophosphor of the present invention has one of various core/shell and core/shell/shell structures expressed by the above-described chemical formulas, and is characterized in that an organic dye (e.g., $C_{45}H_{51}N_2NaO_8S_3$) is bonded to the surface of the nanophosphor. For example, the upconversion nanophosphor may include a core expressed by Chemical Formula 1 and a first shell expressed by Chemical Formula 2, include a core expressed by Chemical Formula 3 and a first shell expressed by Chemical Formula 4, include a core expressed by Chemical Formula 5 and a first shell expressed by Chemical Formula 6, or include a core expressed by Chemical Formula 5, a first shell expressed by Chemical Formula 6, and a second shell expressed by Chemical Formula 7.

However, the present invention is not limited to the afore-described embodiments and other embodiments may be easily proposed based on addition, substitution, etc. of constituent elements.

However, the present invention should not be construed as being limited to the afore-described embodiments and these embodiments are provided so that this disclosure will be thorough and complete.

Hereinafter, methods of synthesizing dye-sensitized upconversion nanophosphors according to embodiments of the present invention will be described.

<Embodiment 1> Synthesis of Organic Dye

In Embodiment 1, an organic dye (e.g., $C_{45}H_{51}N_2NaO_8S_3$) was synthesized.

Initially, 0.13 mmol of an organic dye (e.g., $C_{38}H_{46}ClN_2NaO_6S_2$, IR-783) and 0.52 mmol of 4-mercaptobenzoic acid ($HSC_6H_4CO_2H$) were mixed with dimethylformamide in a reaction flask, and reaction was made in an inert gas atmosphere for 24 hours (dye synthesis step). In this case, the reaction might have been made at a room temperature by blocking the reaction flask from light. After the reaction ended, a reaction solution was filtered using a syringe filter. A precipitate was obtained by putting ether in the filtered solution. The organic dye obtained as described above was washed with ether and then was dispersed and stored in dimethylformamide. The organic dye implemented in Embodiment 1 is $C_{45}H_{51}N_2NaO_8S_3$, IR-808.

FIG. 1 illustrates an absorption spectrum of the organic dye (e.g., $C_{45}H_{51}N_2NaO_8S_3$) synthesized according to Embodiment 1, and an emission spectrum thereof under 800-nm infrared light excitation. The illustrated absorption spectrum shows that the synthesized organic dye has an absorption peak at 808 nm and shows a wide and intense absorption band. As such, it is shown that the synthesized organic dye may effectively absorb light of an infrared region near 800 nm.

<Embodiment 2> Synthesis of
Green-Light-Emitting Upconversion Core
Nanophosphor Doped with $Yb^{3+}$ and $Er^{3+}$ In Embodiment 2, $LiGd_{0.25}Y_{0.55}F_4:Yb^{3+}_{0.18}$, $Er^{3+}_{0.02}$ nanoparticles were synthesized.

Initially, 0.25 mmol of gadolinium chloride hexahydrate ($GdCl_3.6H_2O$), 0.55 mmol of yttrium chloride hexahydrate ($YCl_3.6H_2O$), 0.18 mmol of ytterbium chloride hexahydrate ($YbCl_3.6H_2O$), 0.02 mmol of erbium chloride hexahydrate ($ErCl_3.6H_2O$), and 3.1 mmol of sodium oleate ($C_{18}H_{33}O_2Na$) were measured, and a mixed solvent of water, ethanol, and hexane was added, and then heat treatment was performed at 70° C. to form a lanthanide complex (complex formation step). The complex was mixed with a solution including oleic acid and 1-octadecene and heat treatment was performed at 150° C. for 40 minutes to synthesize a mixture solution including a lanthanide complex (first mixture solution synthesis step).

10 mL of a methanol solution including 2.5 mmol of lithium hydroxide and 4 mmol of ammonium fluoride was synthesized (second mixture solution synthesis step), and then the first mixture solution including the lanthanide complex was mixed with the second mixture solution to synthesize a reaction solution (reaction solution synthesis step).

After being sufficiently mixed, methanol was removed and then heat treatment was performed in an inert gas atmosphere. In this case, the heat treatment might be performed at 230° C. to 320° C. for 10 minutes to 4 hours (nanoparticles formation step). After the heat treatment ended and a cooling process was performed to a room temperature, a colloidal nanophosphor having a diameter of 1 nm to 50 nm was obtained. The nanophosphor obtained as described above was washed with acetone or ethanol and then was dispersed and stored in a non-polar solvent such as hexane, toluene, or chloroform. The nanoparticle implemented in Embodiment 2 is $LiGd_{0.25}Y_{0.55}F_4:Yb^{3+}_{0.18}$, $Er^{3+}_{0.02}$ nanoparticle serving as a core.

<Embodiment 3> Synthesis of
Green-Light-Emitting Upconversion Core/Shell
Nanophosphor Doped with $Yb^{3+}$ and $Er^{3+}$ In Embodiment 3, a core/shell nanophosphor using the $LiGd_{0.25}Y_{0.55}F_4:Yb^{3+}_{0.18}$, $Er^{3+}_{0.02}$ nanoparticle synthesized in Embodiment 2, as a core and including a shell made of a $LiYF_4$ fluoride-based compound doped with $Nd^{3+}$ and $Yb^{3+}$ (e.g., $LiY_{0.55}F_4:Nd^{3+}_{0.4}$, $Yb^{3+}_{0.05}$) was synthesized. The shell covers at least part of the core.

0.55 mmol of yttrium chloride hexahydrate ($YCl_3.6H_2O$), 0.4 mmol of neodymium chloride hexahydrate ($NdCl_3.6H_2O$), and 0.05 mmol of ytterbium chloride hexahydrate ($YbCl_3.6H_2O$) were mixed with a solution including oleic acid and 1-octadecene and heat treatment was performed at 150° C. for 40 minutes to synthesize a mixture solution including a lanthanide complex (first mixture solution synthesis step).

A second mixture solution was synthesized by mixing the first mixture solution with a solution including the $LiGd_{0.25}Y_{0.55}F_4:Yb^{3+}_{0.18}$, $Er^{3+}_{0.02}$ nanoparticles synthesized in Embodiment 2.

10 mL of a methanol solution including 2.5 mmol of lithium hydroxide and 4 mmol of ammonium fluoride was synthesized (third mixture solution synthesis step), and then was mixed with the second mixture solution to synthesize a reaction solution (reaction solution synthesis step).

After being sufficiently mixed, methanol was removed and then heat treatment was performed in an inert gas atmosphere. In this case, the heat treatment might be performed at 230° C. to 320° C. for 10 minutes to 4 hours (nanoparticles formation step). After the heat treatment ended and a cooling process was performed to a room temperature, a colloidal nanophosphor having a diameter of 2 nm to 100 nm was obtained. The nanophosphor obtained as described above was washed with acetone or ethanol and then was dispersed and stored in a non-polar solvent such as hexane, toluene, or chloroform. The core/shell upconversion nanophosphor implemented in Embodiment 3 is a core/shell upconversion nanophosphor including a core made of $LiGd_{0.25}Y_{0.55}F_4:Yb^{3+}_{0.18}$, $Er^{3+}_{0.02}$ and a shell made of $LiY_{0.55}F_4:Nd^{3+}_{0.4}$, $Yb^{3+}_{0.05}$.

Figure 2:
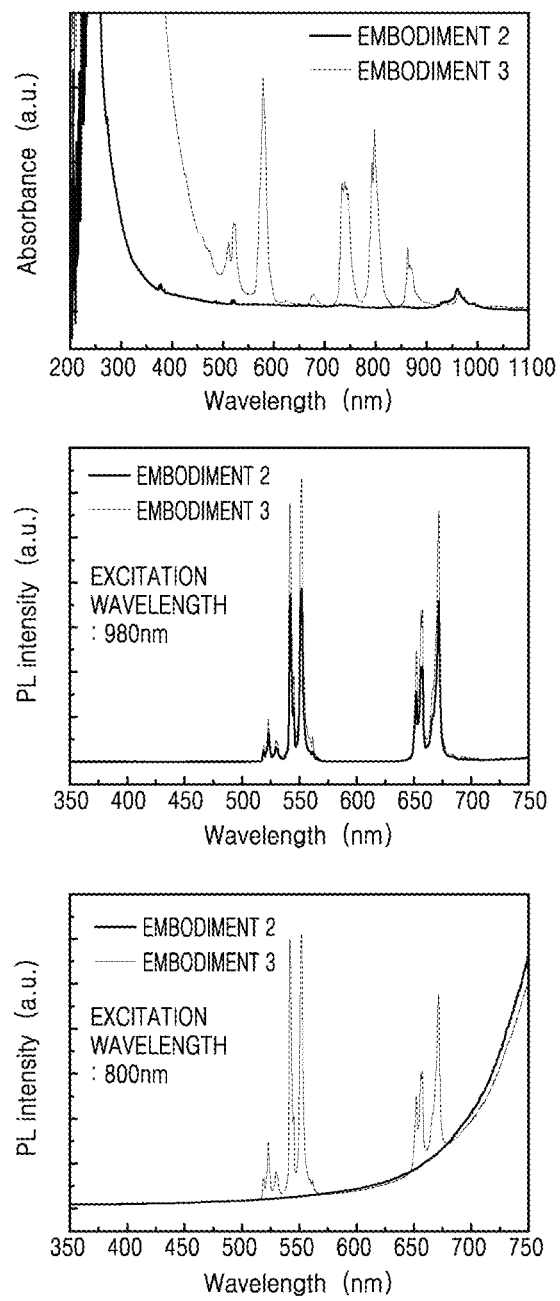
FIG. 2 illustrates absorption spectra of green-light-emitting core and core/shell upconversion nanophosphors according to embodiments of the present invention, and emission spectra thereof under 980-nm and 800-nm infrared light excitation.

FIG. 2 illustrates absorption spectra of the green-light-emitting core (Embodiment 2) and core/shell (Embodiment 3) upconversion nanophosphors synthesized according to Embodiments 2 and 3, and emission spectra thereof under 980-nm and 800-nm infrared light excitation. The illustrated absorption spectra show that the core/shell upconversion nanophosphor has absorption peaks in 980 nm and 800 nm infrared regions, and the illustrated emission spectra show that the core/shell upconversion nanophosphor emits green light with a higher intensity compared to the core upconversion nanophosphor under 980-nm infrared excitation. In addition, it is shown that the core/shell upconversion nanophosphor including shells doped with a sensitizer also emits green light under 800-nm infrared light excitation.

<Embodiment 4> Synthesis of Dye-Sensitized
Green-Light-Emitting Core/Shell Nanophosphor In Embodiment 4, a dye-sensitized green-light-emitting core/shell nanophosphor was synthesized using the organic dye (e.g., $C_{45}H_{51}N_2NaO_8S_3$) synthesized in Embodiment 1 and the $LiGd_{0.25}Y_{0.55}F_4:Yb^{3+}_{0.18}$, $Er^{3+}_{0.02}/LiY_{0.55}F_4:Nd^{3+}_{0.4}$, $Yb^{3+}_{0.05}$ core/shell upconversion nanophosphor synthesized in Embodiment 3.

A mixture solution was synthesized by adding 4 mL of acetonitrile and 0.05 g of nitrosonium tetrafluoroborate ($NOBF_4$) to the core/shell upconversion nanophosphor solution synthesized in Embodiment 3. The mixture solution was mixed with toluene and then a precipitate was separated. Oleic acid ligands on the surface of the nanophosphor obtained as described above were substituted with $BF_4^-$, and the surface-modified upconversion nanophosphor was dispersed and stored in dimethylformamide (surface-modified nanophosphor solution synthesis step).

1 mL of the surface-modified nanophosphor solution was mixed with 0.25 mL of the dye synthesized in Embodiment 1 and then reaction was made in an inert gas atmosphere for 2 hours. After the reaction ended, the nanophosphor bonded with the organic dye (e.g., $C_{45}H_{51}N_2NaO_8S_3$) was dispersed and stored in dimethylformamide.

Figure 3:
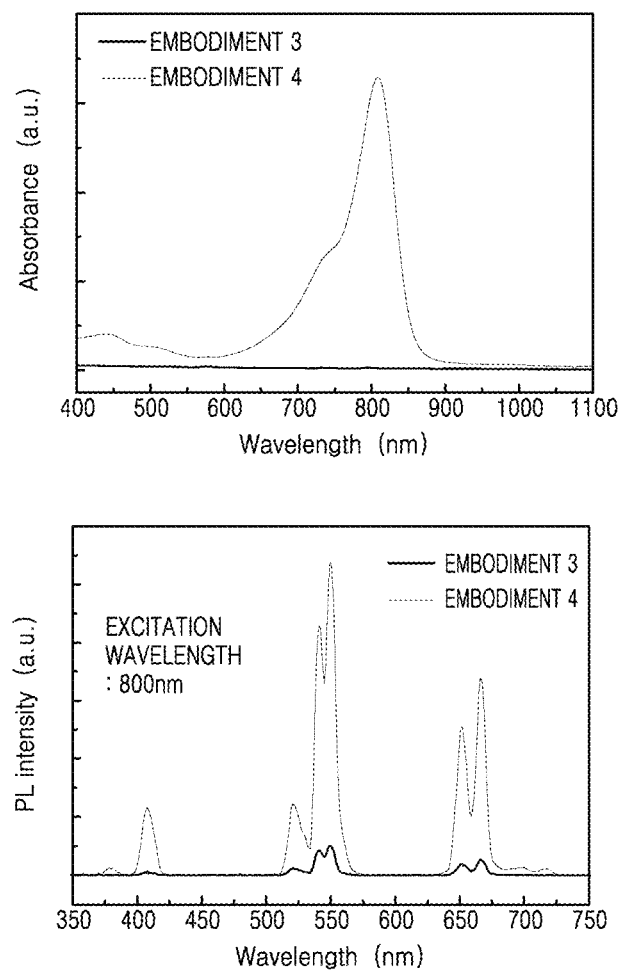
FIG. 3 illustrates absorption spectra of green-light-emitting core/shell and dye-sensitized core/shell upconversion nanophosphors according to embodiments of the present invention, and emission spectra thereof under 800-nm infrared light excitation.
Figure 4:
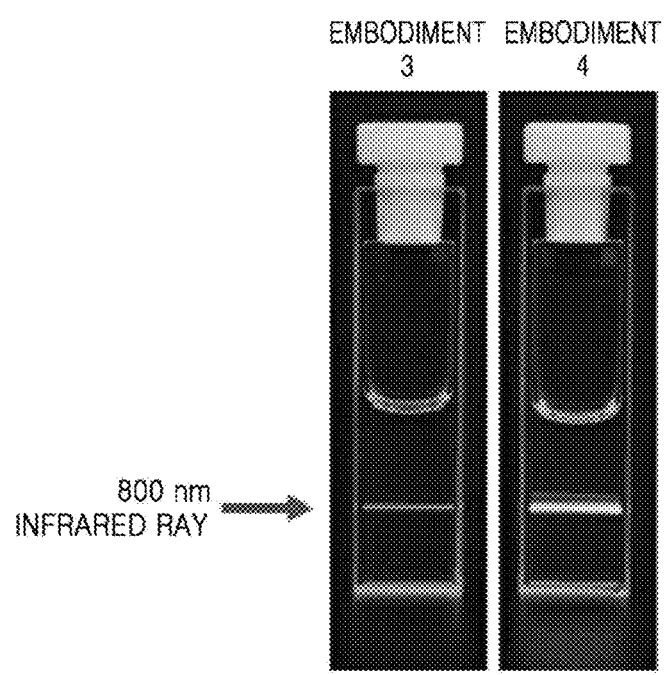
FIG. 4 illustrates emission images of the green-light-emitting core/shell and dye-sensitized core/shell upconversion nanophosphors according to embodiments of the present invention under 800-nm infrared light excitation.

Emission spectra illustrated in FIG. 3 show that the dye-sensitized core/shell upconversion nanophosphor (Embodiment 4) emits green light with an intensity 10 times higher than that of the core/shell upconversion nanophosphor (Embodiment 3) under 800-nm infrared light excitation. Emission images of the green-light-emitting core/shell and dye-sensitized core/shell upconversion nanophosphors synthesized according to Embodiments 3 and 4 in FIG. 4 show that the intensity of green light emitted from the dye-sensitized upconversion nanophosphor is greatly increased.

<Embodiment 5> Synthesis of Blue-Light-Emitting Upconversion Core Nanophosphor Doped with $Yb^{3+}$ and $Tm^{3+}$ 0.25 mmol of gadolinium chloride hexahydrate ($GdCl_3.6H_2O$), 0.49 mmol of yttrium chloride hexahydrate ($YCl_3.6H_2O$), 0.25 mmol of ytterbium chloride hexahydrate ($YbCl_3.6H_2O$), 0.01 mmol of thulium chloride hexahydrate ($TmCl_3.6H_2O$), and 3.1 mmol of sodium oleate ($C_{18}H_{33}O_2Na$) were measured, a mixture solvent of water, ethanol, and hexane was added, and then heat treatment was performed at 70° C. to form a lanthanide complex (complex formation step). The complex was mixed with a solution including oleic acid and 1-octadecene and heat treatment was performed at 150° C. for 40 minutes to synthesize a first mixture solution including a lanthanide complex (first mixture solution synthesis step).

10 mL of a methanol solution including 2.5 mmol of lithium hydroxide and 4 mmol of ammonium fluoride was synthesized (second mixture solution synthesis step), and then was mixed with the first mixture solution including the lanthanide complex to synthesize a reaction solution (reaction solution synthesis step).

After being sufficiently mixed, methanol was removed and then heat treatment was performed in an inert gas atmosphere. In this case, the heat treatment might be performed at 230° C. to 320° C. for 10 minutes to 4 hours (nanoparticles formation step). After the heat treatment ended and a cooling process was performed to a room temperature, a colloidal nanophosphor having a diameter of 1 nm to 50 nm was obtained. The nanophosphor obtained as described above was washed with acetone or ethanol and then was dispersed and stored in a non-polar solvent such as hexane, toluene, or chloroform. The nanoparticle implemented in Embodiment 5 is $LiGd_{0.25}Y_{0.49}F_4:Yb^{3+}_{0.25}$, $Tm^{3+}_{0.01}$ nanoparticle serving as a core.

<Embodiment 6> Synthesis of Blue-Light-Emitting Upconversion Core/Shell Nanophosphor Doped with $Yb^{3+}$ and $Tm^{3+}$ In Embodiment 6, a core/shell nanophosphor using the $LiGd_{0.25}Y_{0.49}F_4:Yb^{3+}_{0.25}$, $Tm^{3+}_{0.01}$ nanoparticle synthesized in Embodiment 5, as a core and including a shell made of a $LiYF_4$ fluoride-based compound doped with $Nd^{3+}$ and $Yb^{3+}$ was synthesized. The shell covers at least part of the core.

0.45 mmol of yttrium chloride hexahydrate ($YCl_3.6H_2O$), 0.5 mmol of neodymium chloride hexahydrate ($NdCl_3.6H_2O$), and 0.05 mmol of ytterbium chloride hexahydrate ($YbCl_3.6H_2O$) were mixed with a solution including oleic acid and 1-octadecene and heat treatment was performed at 150° C. for 40 minutes to synthesize a mixture solution including a lanthanide complex (first mixture solution synthesis step).

A second mixture solution was synthesized by mixing the first mixture solution with a solution including the $LiGd_{0.25}Y_{0.49}F_4:Yb^{3+}_{0.25}$, $Er^{3+}_{0.01}$ nanoparticles synthesized in Embodiment 5.

10 mL of a methanol solution including 2.5 mmol of lithium hydroxide and 4 mmol of ammonium fluoride was synthesized (third mixture solution synthesis step), and then was mixed with the second mixture solution to synthesize a reaction solution (reaction solution synthesis step).

After being sufficiently mixed, methanol was removed and then heat treatment was performed in an inert gas atmosphere. In this case, the heat treatment might be performed at 230° C. to 320° C. for 10 minutes to 4 hours (nanoparticles formation step). After the heat treatment ended and a cooling process was performed to a room temperature, a colloidal nanophosphor having a diameter of 2 nm to 100 nm was obtained. The nanophosphor obtained as described above was washed with acetone or ethanol and then was dispersed and stored in a non-polar solvent such as hexane, toluene, or chloroform. The core/shell upconversion nanophosphor implemented in Embodiment 6 is a core/shell upconversion nanophosphor including a core made of $LiGd_{0.25}Y_{0.49}F_4:Yb^{3+}_{0.25}$, $Tm^{3+}_{0.01}$ and a shell made of $LiY_{0.45}F_4:Nd^{3+}_{0.5}$, $Yb^{3+}_{0.05}$.

Figure 5:
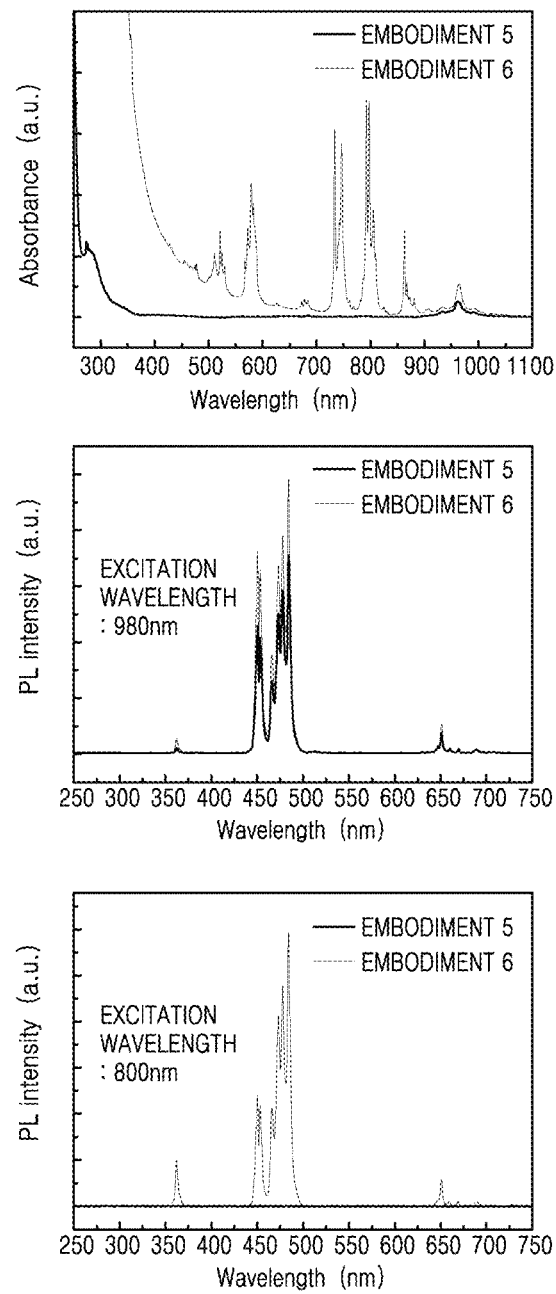
FIG. 5 illustrates emission spectra of blue-light-emitting core and core/shell upconversion nanophosphors according to embodiments of the present invention under 980-nm and 800-nm infrared light excitation.

Emission spectra illustrated in FIG. 5 show that the core/shell upconversion nanophosphor (Embodiment 6) emits blue light with a higher intensity compared to the core upconversion nanophosphor (Embodiment 5) under 980-nm infrared excitation. In addition, it is shown that the core/shell upconversion nanophosphor (Embodiment 6) also emits blue light under 800-nm infrared light excitation.

<Embodiment 7> Synthesis of Dye-Sensitized Blue-Light-Emitting Core/Shell Nanophosphor In Embodiment 7, a dye-sensitized blue-light-emitting core/shell nanophosphor was synthesized using $LiGd_{0.25}Y_{0.49}F_4:Yb^{3+}_{0.25}$, $Tm^{3+}_{0.01}/LiY_{0.45}F_4:Nd^{3+}_{0.5}$, $Yb^{3+}_{0.05}$ synthesized in Embodiment 6 and the organic dye (e.g., $C_{45}H_{51}N_2NaO_8S_3$) synthesized in Embodiment 1.

A mixture solution was synthesized by adding 2 mL of acetonitrile and 0.02 g of nitrosonium tetrafluoroborate ($NOBF_4$) to the core/shell solution synthesized in Embodiment 6. The mixture solution was mixed with toluene and then a precipitate was separated. Oleic acid ligands on the surface of the nanophosphor obtained as described above were substituted with $BF_4^-$, and the surface-modified upconversion nanophosphor was dispersed and stored in dimethylformamide (surface-modified nanophosphor solution synthesis step).

1 mL of the surface-modified nanophosphor solution was mixed with 0.1 mL of the organic dye synthesized in Embodiment 1 and then reaction was made in an inert gas atmosphere for 2 hours. After the reaction ended, the nanophosphor bonded with the organic dye (e.g., $C_{45}H_{51}N_2NaO_8S_3$) was dispersed and stored in dimethylformamide.

Figure 6:
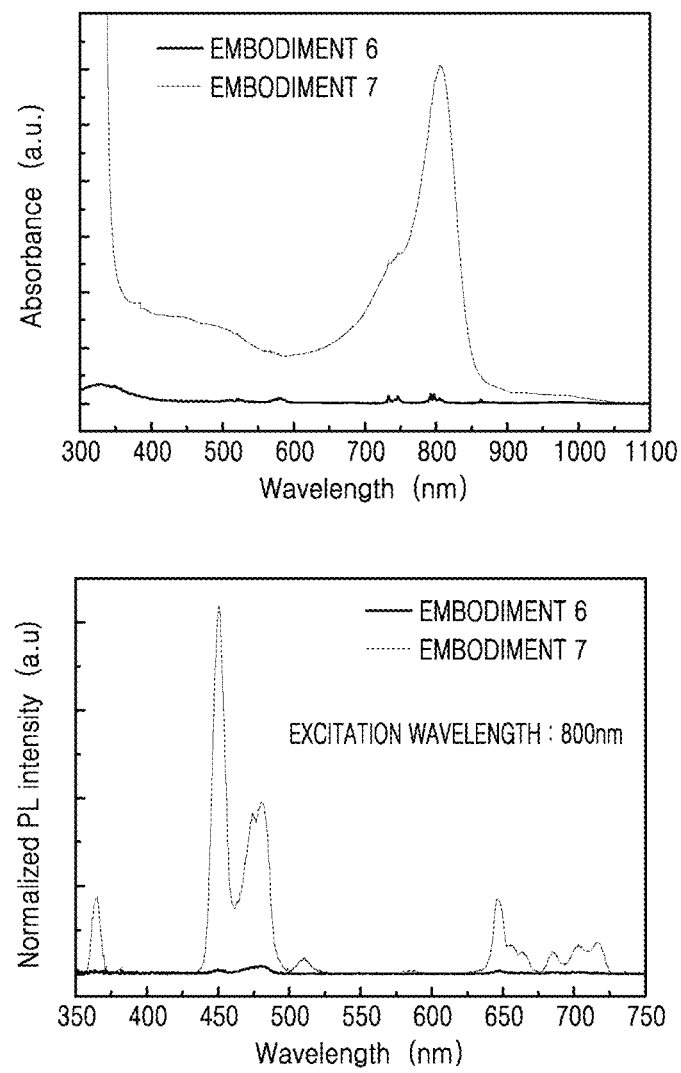
FIG. 6 illustrates absorption spectra of blue-light-emitting core/shell and dye-sensitized core/shell upconversion nanophosphors according to embodiments of the present invention, and emission spectra thereof under 800-nm infrared light excitation.
Figure 7:
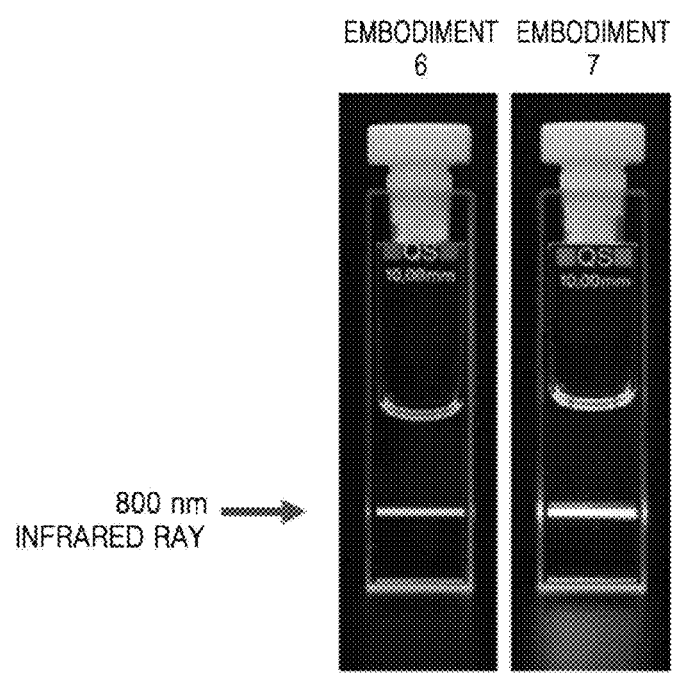
FIG. 7 illustrates emission images of the blue-light-emitting core/shell and dye-sensitized core/shell upconversion nanophosphors according to embodiments of the present invention under 800-nm infrared light excitation.

Absorption spectra illustrated in FIG. 6 show that the synthesized dye-sensitized core/shell nanophosphor (Embodiment 7) has a wide and high absorption spectrum at 800 nm. It is shown that the dye-sensitized core/shell upconversion nanophosphor (Embodiment 7) emits blue light with an intensity 83 times higher than that of the core/shell upconversion nanophosphor (Embodiment 6) under 800-nm infrared light excitation. Emission images illustrated in FIG. 7 show that the dye-sensitized blue-light-emitting nanophosphor (Embodiment 7) emits much brighter blue light compared to the blue-light-emitting core/shell upconversion nanophosphor (Embodiment 6).

<Embodiment 8> Synthesis of Red-Light-Emitting Upconversion Core Nanophosphor Doped with $Yb^{3+}$, $Ho^{3+}$, and $Ce^{3+}$ 0.5 mmol of gadolinium chloride hexahydrate ($GdCl_3 \cdot 6H_2O$), 0.18 mmol of ytterbium chloride hexahydrate ($YbCl_3 \cdot 6H_2O$), 0.02 mmol of holmium chloride hexahydrate ($HoCl_3 \cdot 6H_2O$), 0.3 mmol of cerium chloride heptahydrate ($CeCl_3 \cdot 7H_2O$), and 3.1 mmol of sodium oleate ($C_{18}H_{33}O_2Na$) were measured, a mixture solvent of water, ethanol, and hexane was added, and then heat treatment was performed at 70° C. to form a lanthanide complex (complex formation step). The complex was mixed with a solution including oleic acid and 1-octadecene and heat treatment was performed at 150° C. for 30 minutes to synthesize a first mixture solution including a lanthanide complex (first mixture solution synthesis step).

10 mL of a methanol solution including 2.5 mmol of sodium hydroxide and 4 mmol of ammonium fluoride was synthesized (second mixture solution synthesis step), and then was mixed with the first mixture solution including the lanthanide complex to synthesize a reaction solution (reaction solution synthesis step).

After being sufficiently mixed, methanol was removed and then heat treatment was performed in an inert gas atmosphere. In this case, when the heat treatment was performed at a temperature lower than 230° C., nanocrystals of a single hexagonal phase might not be appropriately formed and thus the phosphor might not emit light with a high intensity. When the heat treatment was performed at a temperature higher than 370° C., particles might agglomerate together due to overreaction and have very large and non-uniform sizes and thus a reduction in brightness might be caused. Therefore, the heat treatment might be performed at 230° C. to 370° C. for 10 minutes to 4 hours (nanoparticles formation step). After the heat treatment ended and a cooling process was performed to a room temperature, a colloidal nanophosphor having a diameter of 1 nm to 20 nm was obtained. The nanophosphor obtained as described above was washed with acetone or ethanol and then was dispersed and stored in a non-polar solvent such as hexane, toluene, or chloroform. The nanoparticle implemented in Embodiment 8 is $NaGd_{0.5}F_4:Yb^{3+}_{0.18}$, $Ho^{3+}_{0.02}$, $Ce^{3+}_{0.3}$ nanoparticle serving as a core.

<Embodiment 9> Synthesis of Red-Light-Emitting Upconversion Core/Shell Nanophosphor Doped with $Yb^{3+}$, $Ho^{3+}$, and $Ce^{3+}$ In Embodiment 9, a core/shell nanophosphor using the $NaGd_{0.5}F_4:Yb^{3+}_{0.18}$, $Ho^{3+}_{0.02}$, $Ce^{3+}_{0.3}$ nanoparticle synthesized in Embodiment 8, as a core and including a shell made of a $NaGdF_4$ fluoride-based compound doped with $Nd^{3+}$ and $Yb^{3+}$ (e.g., $NaGd_{0.45}F_4:Nd^{3+}_{0.5}, Yb^{3+}_{0.05}$) was synthesized. The shell covers at least part of the core.

0.45 mmol of gadolinium chloride hexahydrate ($GdCl_3 \cdot 6H_2O$), 0.5 mmol of neodymium chloride hexahydrate ($NdCl_3 \cdot 6H_2O$), 0.05 mmol of ytterbium chloride hexahydrate ($YbCl_3 \cdot 6H_2O$), and 3.1 mmol of sodium oleate ($C_{18}H_{33}O_2Na$) were measured, a mixture solvent of water, ethanol, and hexane was added, and then heat treatment was performed at 70° C. to form a lanthanide complex (complex formation step). The complex was mixed with a solution including oleic acid and 1-octadecene and heat treatment was performed at 150° C. for 30 minutes to synthesize a first mixture solution including a lanthanide complex (first mixture solution synthesis step).

A second mixture solution was synthesized by mixing the first mixture solution with a solution including the $NaGd_{0.5}F_4:Yb^{3+}_{0.18}$, $Ho^{3+}_{0.02}$, $Ce^{3+}_{0.3}$ nanoparticles synthesized in Embodiment 8.

10 mL of a methanol solution including 2.5 mmol of sodium hydroxide and 4 mmol of ammonium fluoride was synthesized (third mixture solution synthesis step), and then was mixed with the second mixture solution to synthesize a reaction solution (reaction solution synthesis step).

After being sufficiently mixed, methanol was removed and then heat treatment was performed in an inert gas atmosphere. In this case, when the heat treatment was performed at a temperature lower than 200° C., nanocrystals of a single hexagonal phase might not be appropriately formed and thus the phosphor might not emit light with a high intensity. When the heat treatment was performed at a temperature higher than 370° C., particles might agglomerate together due to overreaction and have very large and non-uniform sizes and thus a reduction in brightness might be caused. Therefore, the heat treatment might be performed at 200° C. to 370° C. for 10 minutes to 4 hours (nanoparticles formation step). After the heat treatment ended and a cooling process was performed to a room temperature, a colloidal nanophosphor having a diameter of 2 nm to 60 nm was obtained. The nanophosphor obtained as described above was washed with acetone or ethanol and then was dispersed and stored in a non-polar solvent such as hexane, toluene, or chloroform.

Figure 8:
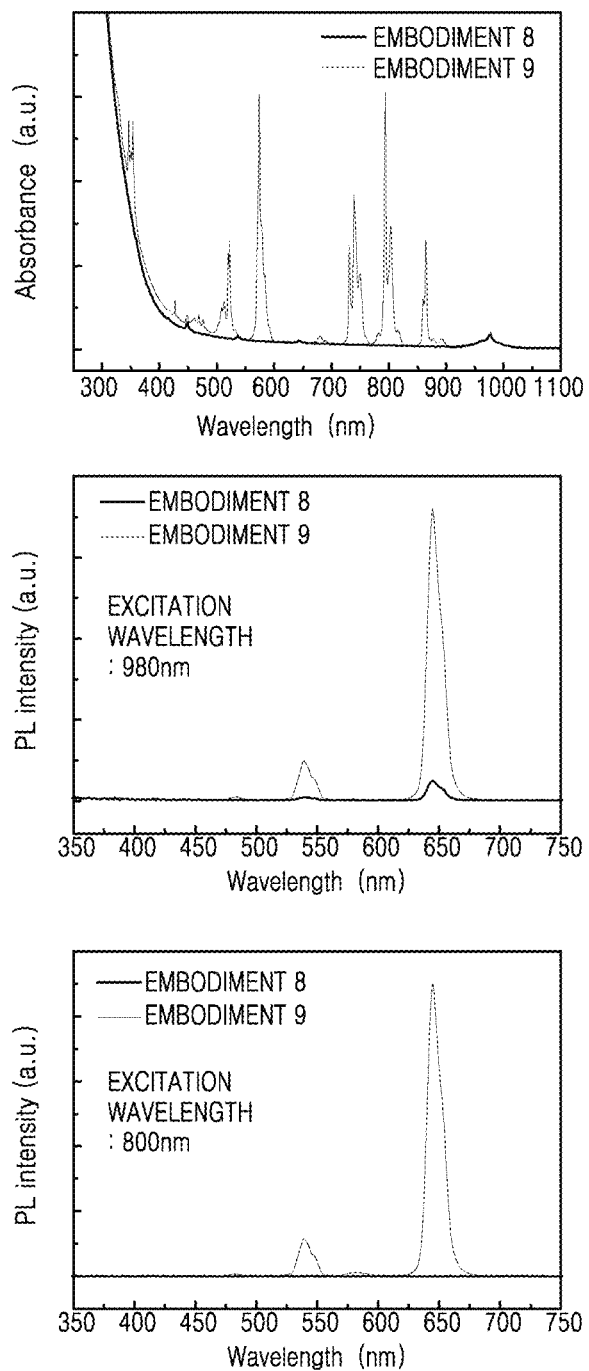
FIG. 8 illustrates emission spectra of red-light-emitting core and core/shell upconversion nanophosphors according to embodiments of the present invention under 980-nm and 800-nm infrared light excitation.

FIG. 8 illustrates emission spectra of the red-light-emitting core and core/shell upconversion nanophosphors synthesized according to Embodiments 8 and 9. The emission spectra under 980-nm infrared excitation in FIG. 8 show that the core/shell upconversion nanophosphor (Embodiment 9) emits red light with a higher intensity compared to the core upconversion nanophosphor (Embodiment 8). In addition, the emission spectra illustrated in FIG. 8 show that the core/shell upconversion nanophosphor (Embodiment 9) also emits red light under 800-nm infrared light excitation.

<Embodiment 10> Synthesis of Dye-Sensitized Core/Shell Red-Light-Emitting Upconversion Nanophosphor In Embodiment 10, a dye-sensitized red-light-emitting core/shell nanophosphor was synthesized using the organic dye (e.g., $C_{45}H_{51}N_2NaO_8S_3$) synthesized in Embodiment 1 and $NaGd_{0.5}F_4:Yb^{3+}_{0.18}$, $Ho^{3+}_{0.02}$, $Ce^{3+}_{0.3}/NaGd_{0.45}F_4:Nd^{3+}_{0.5}$, $Yb^{3+}_{0.05}$ synthesized in Embodiment 9.

A mixture solution was synthesized by adding 2 mL of acetonitrile and 0.01 g of nitrosonium tetrafluoroborate ($NOBF_4$) to 1 mL of the $NaGd_{0.5}F_4:Yb^{3+}_{0.18}$, $Ho^{3+}_{0.02}$, $Ce^{3+}_{0.3}/NaGd_{0.45}F_4:Nd^{3+}_{0.5}$, $Yb^{3+}_{0.05}$ core/shell solution synthesized in Embodiment 9 (mixture solution synthesis step). The mixture solution was mixed with toluene and then a precipitate was separated. Oleic acid ligands on the surface of the nanophosphor obtained as described above were substituted with $BF_4^-$, and the +surface-modified upconversion nanophosphor was dispersed and stored in dimethylformamide (surface-modified nanophosphor solution synthesis step).

1 mL of the surface-modified nanophosphor solution was mixed with 0.2 mL of the organic dye synthesized in Embodiment 1 and then reaction was made in an inert gas atmosphere for 2 hours. After the reaction ended, the nanophosphor having the organic dye (e.g., $C_{45}H_{51}N_2NaO_8S_3$) bonded thereto was dispersed and stored in dimethylformamide.

Figure 9:
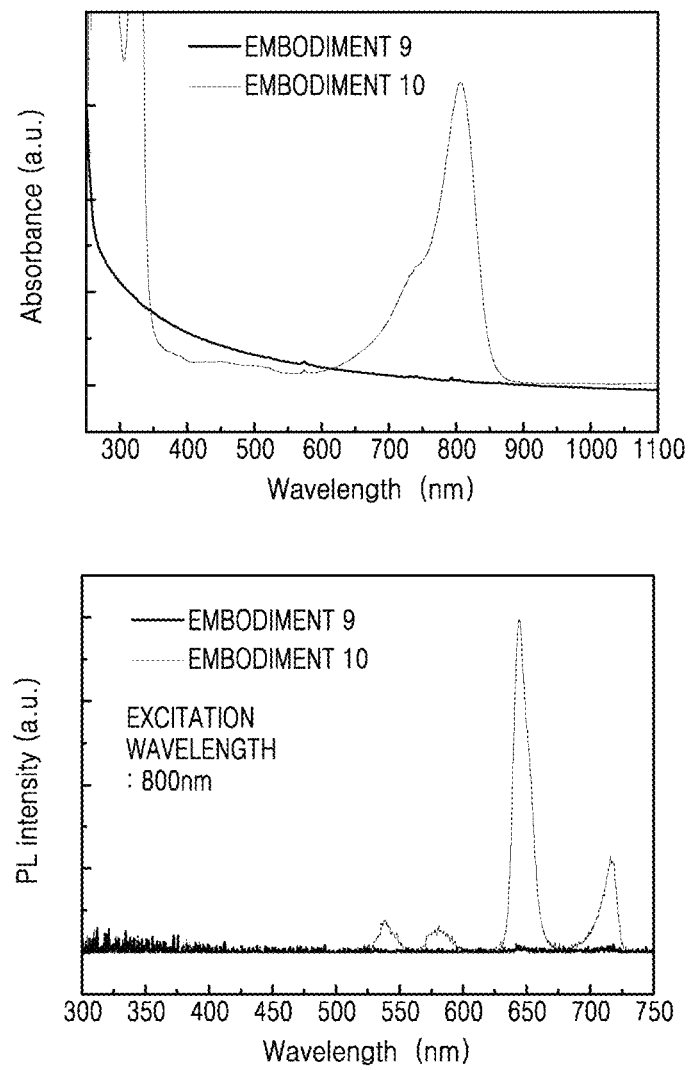
FIG. 9 illustrates absorption spectra of red-light-emitting core/shell and dye-sensitized core/shell upconversion nanophosphors according to embodiments of the present invention, and emission spectra thereof under 800-nm infrared light excitation.
Figure 10:
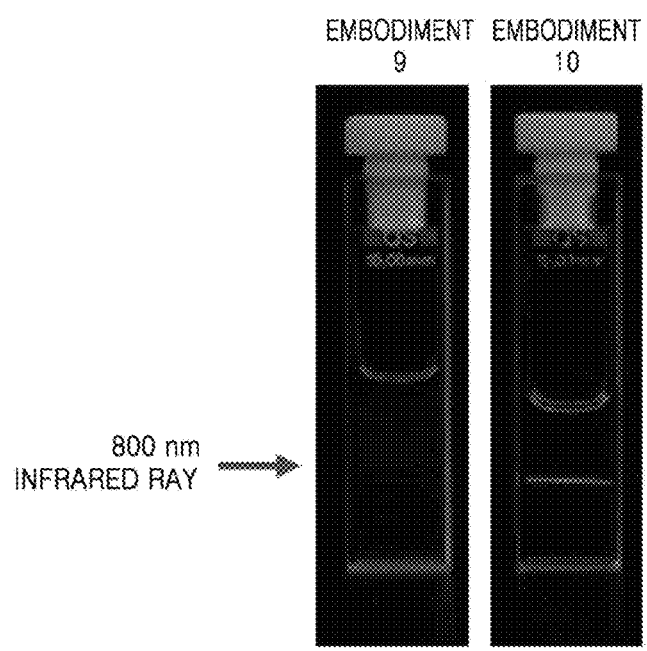
FIG. 10 illustrates emission images of the red-light-emitting core/shell and dye-sensitized core/shell upconversion nanophosphors according to embodiments of the present invention under 800-nm infrared light excitation.

Absorption spectra illustrated in FIG. 9 show that the synthesized dye-sensitized core/shell nanophosphor (Embodiment 10) has a wide and intense absorption band at 800 nm. It is shown that the core/shell upconversion nanophosphor (Embodiment 9) has an almost no emission peak but the dye-sensitized core/shell upconversion nanophosphor (Embodiment 10) has an intense red-light emission peak under 800-nm infrared light excitation. Emission images illustrated in FIG. 10 show that the dye-sensitized core/shell upconversion nanophosphor (Embodiment 10) emits red light with a higher intensity compared to the core/shell upconversion nanophosphor (Embodiment 9).

<Embodiment 11> Synthesis of Core/Shell/Shell Red-Light-Emitting Upconversion Nanophosphor Doped with $Nd^{3+}$ In Embodiment 11, a core/first shell/second shell nanophosphor using the $NaGd_{0.5}F_4:Yb^{3+}_{0.18}$, $Ho^{3+}_{0.02}$, $Ce^{3+}_{0.3}/NaGd_{0.45}F_4:Nd^{3+}_{0.5}$, $Yb^{3+}_{0.05}$ nanoparticle synthesized in Embodiment 9, as a core/first shell and including a second shell made of a $NaGdF_4$ fluoride-based compound doped with $Nd^{3+}$ was synthesized. The first shell covers at least part of the core, and the second shell covers at least part of the core/first shell.

0.7 mmol of gadolinium chloride hexahydrate ($GdCl_3 \cdot 6H_2O$) and 0.3 mmol of neodymium chloride hexahydrate ($NdCl_3 \cdot 6H_2O$) were mixed with a solution including oleic acid and 1-octadecene and heat treatment was performed at 150° C. for 30 minutes to synthesize a mixture solution including a lanthanide complex (first mixture solution synthesis step).

A second mixture solution was synthesized by mixing the first mixture solution with a solution including the $NaGd_{0.5}F_4:Yb^{3+}_{0.18}$, $Ho^{3+}_{0.02}$, $Ce^{3+}_{0.3}/NaGd_{0.45}F_4:Nd^{3+}_{0.5}$, $Yb^{3+}_{0.05}$ nanoparticle synthesized in Embodiment 9.

10 mL of a methanol solution including 2.5 mmol of sodium hydroxide and 4 mmol of ammonium fluoride was synthesized (third mixture solution synthesis step), and then was mixed with the second mixture solution to synthesize a reaction solution (reaction solution synthesis step).

After being sufficiently mixed, methanol was removed and then heat treatment was performed in an inert gas atmosphere. In this case, when the heat treatment was performed at a temperature lower than 200° C., nanocrystals of a single hexagonal phase might not be appropriately formed and thus the phosphor might not emit light at a high intensity. When the heat treatment was performed at a temperature higher than 370° C., particles might agglomerate together due to overreaction and have very large and non-uniform sizes and thus a reduction in brightness might be caused. Therefore, the heat treatment might be performed at 200° C. to 370° C. for 10 minutes to 4 hours (nanoparticles formation step). After the heat treatment ended and a cooling process was performed to a room temperature, a colloidal nanophosphor having a diameter of 3 nm to 100 nm was obtained. The nanophosphor obtained as described above was washed with acetone or ethanol and then was dispersed and stored in a non-polar solvent such as hexane, toluene, or chloroform. The red-light-emitting core/first shell/second shell nanophosphor implemented in Embodiment 11 is a nanophosphor including a core made of $NaGd_{0.5}F_4:Yb^{3+}_{0.18}$, $Ho^{3+}_{0.02}$, $Ce^{3+}_{0.3}$, a first shell made of $NaGd_{0.45}F_4:Nd^{3+}_{0.5}$, $Yb^{3+}_{0.05}$, and a second shell made of $NaGd_{0.7}F_4:Nd^{3+}_{0.3}$.

Figure 11:
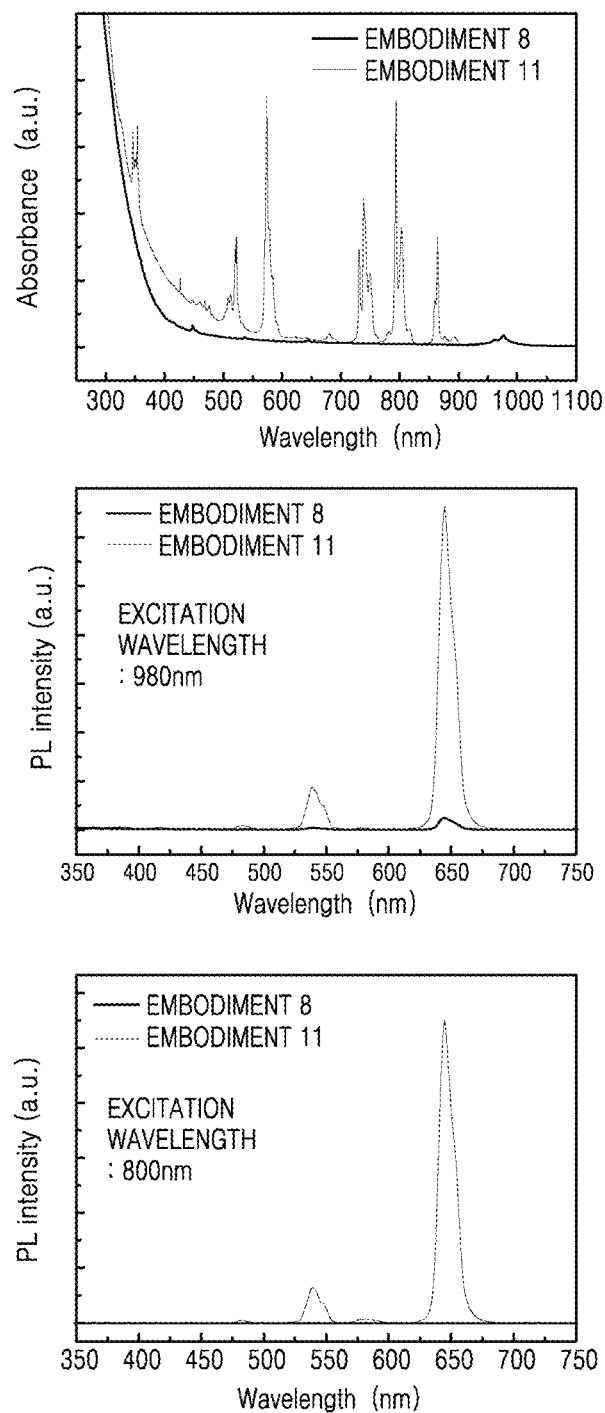
FIG. 11 illustrates emission spectra of red-light-emitting core and core/shell/shell upconversion nanophosphors according to embodiments of the present invention under 980-nm and 800-nm infrared light excitation.

Emission spectra illustrated in FIG. 11 show that the core/shell/shell structure upconversion nanophosphor synthesized according to Embodiment 11 emits red light at a higher intensity compared to the core upconversion nanophosphor synthesized according to Embodiment 8, under 980-nm infrared excitation. In addition, it is shown that the core/shell/shell upconversion nanophosphor (Embodiment 11) also emits red light under 800-nm infrared light excitation.

<Embodiment 12> Synthesis of Dye-Sensitized Red-Light-Emitting Core/Shell/Shell Nanophosphor In Embodiment 12, a dye-sensitized red-light-emitting core/shell/shell nanophosphor was synthesized using the organic dye (e.g., $C_{45}H_{51}N_2NaO_8S_3$) synthesized in Embodiment 1 and $NaGd_{0.5}F_4:Yb^{3+}_{0.18}$, $Ho^{3+}_{0.02}$, $Ce^{3+}_{0.3}/NaGd_{0.45}F_4:Nd^{3+}_{0.5}$, $Yb^{3+}_{0.05}/NaGd_{0.7}F_4:Nd^{3+}_{0.3}$ synthesized in Embodiment 11.

A mixture solution was synthesized by adding 2 mL of acetonitrile and 0.01 g of nitrosonium tetrafluoroborate ($NOBF_4$) to the $NaGd_{0.5}F_4:Yb^{3+}_{0.18}$, $Ho^{3+}_{0.02}$, $Ce^{3+}_{0.3}/NaGd_{0.45}F_4:Nd^{3+}_{0.5}$, $Yb^{3+}_{0.05}/NaGd_{0.7}F_4:Nd^{3+}_{0.3}$ nanoparticle solution synthesized in Embodiment 11 (mixture solution synthesis step). The mixture solution was mixed with toluene and then a precipitate was separated. Oleic acid ligands on the surface of the nanophosphor obtained as described above were substituted with $BF_4^-$, and the surface-modified upconversion nanophosphor was dispersed and stored in dimethylformamide (surface-modified nanophosphor solution synthesis step).

1 mL of the surface-modified nanophosphor solution was mixed with 0.75 mL of the organic dye synthesized in Embodiment 1 and then reaction was made in an inert gas atmosphere for 2 hours. After the reaction ended, the nanophosphor having the organic dye (e.g., $C_{45}H_{51}N_2NaO_8S_3$) bonded thereto was dispersed and stored in dimethylformamide.

Figure 12:
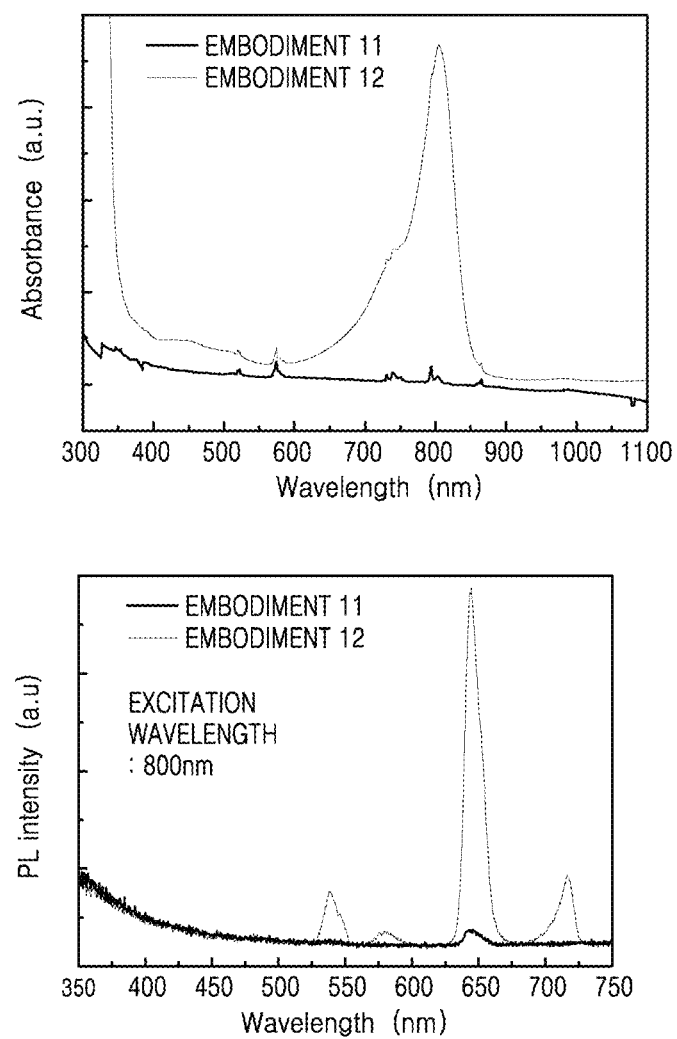
FIG. 12 illustrates absorption spectra of red-light-emitting core/shell/shell and dye-sensitized core/shell/shell upconversion nanophosphors according to embodiments of the present invention, and emission spectra thereof under 800-nm infrared light excitation.
Figure 13:
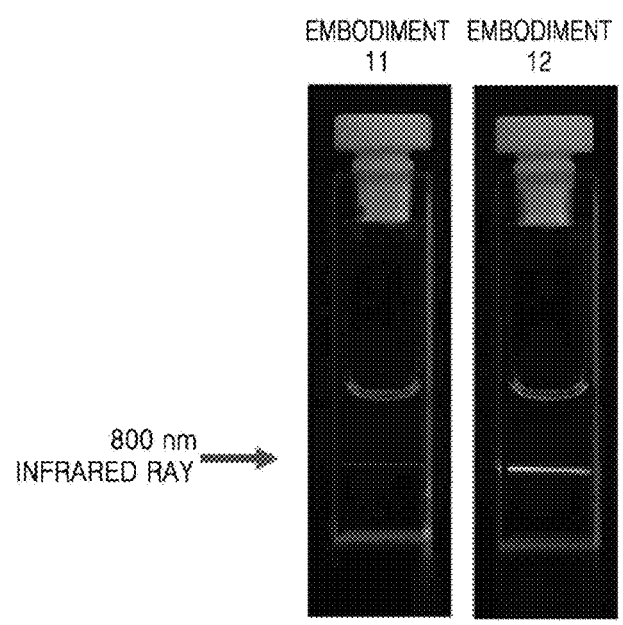
FIG. 13 illustrates emission images of the red-light-emitting core/shell/shell and dye-sensitized core/shell/shell upconversion nanophosphors according to embodiments of the present invention under 800-nm infrared light excitation.

Absorption spectra illustrated in FIG. 12 show that the dye-sensitized core/shell/shell upconversion nanophosphor synthesized according to Embodiment 12 has a high absorption spectrum at 800 nm. It is shown that the dye-sensitized core/shell/shell upconversion nanophosphor (Embodiment 12) emits red light at an intensity 10 times higher than that of the core/shell/shell upconversion nanophosphor (Embodiment 11) under 800-nm infrared light excitation. Emission images illustrated in FIG. 13 show that the dye-sensitized core/shell/shell upconversion nanophosphor (Embodiment 12) emits red light at a higher intensity compared to the core/shell/shell upconversion nanophosphor (Embodiment 11).

<Embodiment 13> Synthesis of Core/Shell/Shell Red-Light-Emitting Upconversion Nanophosphor In Embodiment 13, a core/first shell/second shell nanophosphor using the $NaGd_{0.5}F_4:Yb^{3+}_{0.18}$, $Ho^{3+}_{0.02}$, $Ce^{3+}_{0.3}$/$NaGd_{0.45}F_4:Nd^{3+}_{0.5}$, $Yb^{3+}_{0.05}$ nanoparticle synthesized in Embodiment 9, as a cores/first shell and including a second shell made of a $NaGdF_4$ fluoride-based compound was synthesized.

Initially, 1 mmol of gadolinium chloride hexahydrate ($GdCl_3 \cdot 6H_2O$) was mixed with a solution including oleic acid and 1-octadecene and heat treatment was performed at 150° C. for 30 minutes to synthesize a mixture solution including a lanthanide complex (first mixture solution synthesis step).

A second mixture solution was synthesized by mixing the first mixture solution with a solution including the $NaGd_{0.5}F_4:Yb^{3+}_{0.18}$, $Ho^{3+}_{0.02}$, $Ce^{3+}_{0.3}$/$NaGd_{0.45}F_4:Nd^{3+}_{0.5}$, $Yb^{3+}_{0.05}$ nanoparticles synthesized in Embodiment 9.

10 mL of a methanol solution including 2.5 mmol of sodium hydroxide and 4 mmol of ammonium fluoride was synthesized (third mixture solution synthesis step), and then was mixed with the second mixture solution to synthesize a reaction solution (reaction solution synthesis step).

After being sufficiently mixed, methanol was removed and then heat treatment was performed in an inert gas atmosphere. In this case, when the heat treatment was performed at a temperature lower than 200° C., nanocrystals of a single hexagonal phase might not be appropriately formed and thus the phosphor might not emit light at a high intensity. When the heat treatment was performed at a temperature higher than 370° C., particles might agglomerate together due to overreaction and have very large and non-uniform sizes and thus a reduction in brightness might be caused. Therefore, the heat treatment might be performed at 200° C. to 370° C. for 10 minutes to 4 hours (nanoparticles formation step). After the heat treatment ended and a cooling process was performed to a room temperature, a colloidal nanophosphor having a diameter of 3 nm to 100 nm was obtained. The nanophosphor obtained as described above was washed with acetone or ethanol and then was dispersed and stored in a non-polar solvent such as hexane, toluene, or chloroform.

Figure 14:
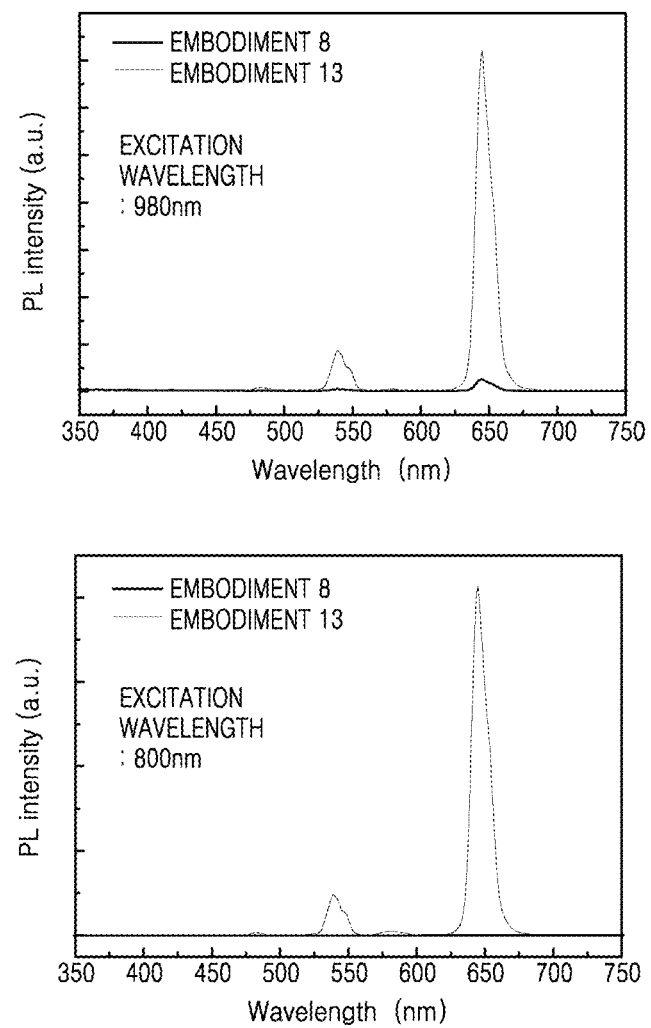
FIG. 14 illustrates emission spectra of red-light-emitting core and core/shell/shell upconversion nanophosphors according to embodiments of the present invention under 980-nm and 800-nm infrared light excitation.

Emission spectra illustrated in FIG. 14 show that the core/shell/shell upconversion nanophosphor synthesized according to Embodiment 13 emits red light at a higher intensity compared to the core upconversion nanophosphor synthesized according to Embodiment 8, under 980-nm infrared excitation. In addition, it is shown that the core/shell/shell upconversion nanophosphor (Embodiment 13) also emits red light under 800-nm infrared light excitation.

<Embodiment 14> Synthesis of Dye-Sensitized Red-Light-Emitting Core/Shell/Shell Nanophosphor In Embodiment 14, a dye-sensitized red-light-emitting core/shell/shell nanophosphor was synthesized using the organic dye (e.g., $C_{45}H_{51}N_2NaO_8S_3$) synthesized in Embodiment 1 and $NaGd_{0.5}F_4:Yb^{3+}_{0.18}$, $Ho^{3+}_{0.02}$, $Ce^{3+}_{0.3}$/$NaGd_{0.45}F_4:Nd^{3+}_{0.5}$, $Yb^{3+}_{0.05}$/$NaGdF_4$ synthesized in Embodiment 13.

A mixture solution was synthesized by adding 2 mL of acetonitrile and 0.01 g of nitrosonium tetrafluoroborate ($NOBF_4$) to the $NaGd_{0.5}F_4:Yb^{3+}_{0.18}$, $Ho^{3+}0.02$, $Ce^{3+}_{0.3}$/$NaGd_{0.45}F_4:Nd^{3+}_{0.5}$, $Yb^{3+}_{0.05}$/$NaGdF_4$ nanoparticle solution synthesized in Embodiment 13 (mixture solution synthesis step). The mixture solution was mixed with toluene and then a precipitate was separated. Oleic acid ligands on the surface of the nanophosphor obtained as described above were substituted with $BF_4^-$, and the surface-modified upconversion nanophosphor was dispersed and stored in dimethylformamide (surface-modified nanophosphor solution synthesis step).

The surface-modified nanophosphor solution was mixed with 1 mL of the organic dye synthesized in Embodiment 1 and then reaction was made in an inert gas atmosphere for 2 hours. After the reaction ended, the dye-sensitized nanophosphor was dispersed and stored in dimethylformamide.

Figure 15:
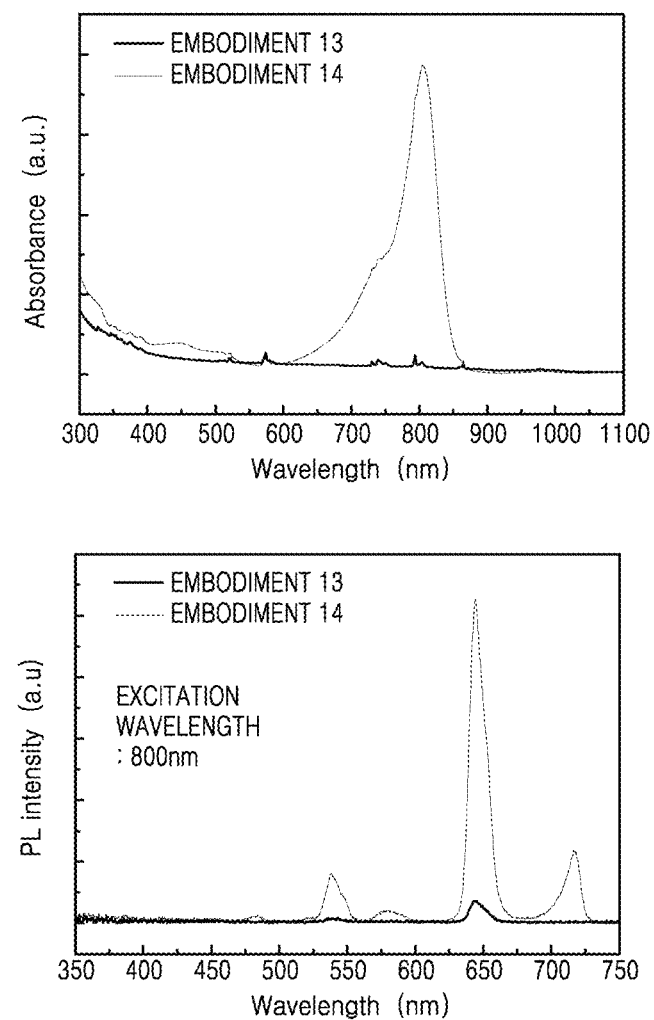
FIG. 15 illustrates absorption spectra of red-light-emitting core/shell/shell and dye-sensitized core/shell/shell upconversion nanophosphors according to embodiments of the present invention, and emission spectra thereof under 800-nm infrared light excitation.
Figure 16:
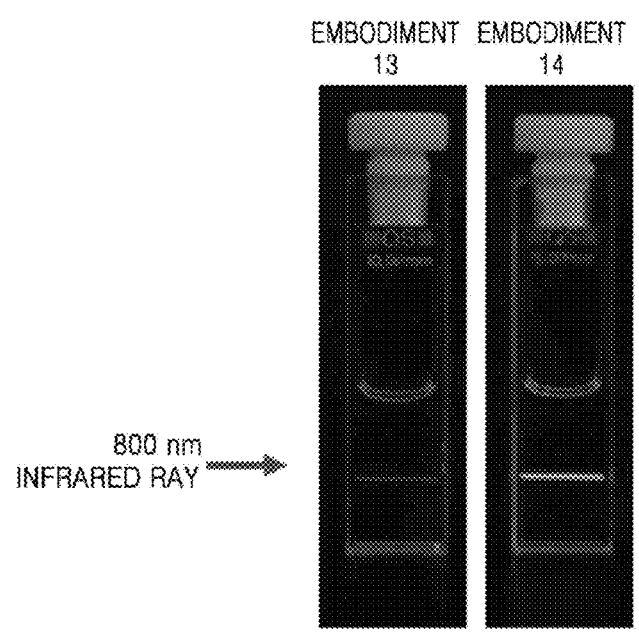
FIG. 16 illustrates emission images of the red-light-emitting core/shell/shell and dye-sensitized core/shell/shell upconversion nanophosphors according to embodiments of the present invention under 800-nm infrared light excitation.

Absorption spectra illustrated in FIG. 15 show that the dye-sensitized red-light-emitting nanophosphor synthesized according to Embodiment 14 has a high absorption spectrum in an 800-nm region. In addition, it is shown that the dye-sensitized core/shell/shell upconversion nanophosphor (Embodiment 14) emits red light at an intensity 14 times higher than that of the core/shell/shell upconversion nanophosphor (Embodiment 13) under 800-nm infrared light excitation. Emission images illustrated in FIG. 16 show that the dye-sensitized core/shell/shell upconversion nanophosphor (Embodiment 14) emits red light at a higher intensity compared to the core/shell/shell upconversion nanophosphor (Embodiment 13) under 800-nm infrared light excitation.

The present invention has been particularly shown and described with reference to various embodiments thereof. The dye-sensitized nanophosphors and the methods of synthesizing the same, according to the various embodiments of the present invention, are applicable to a variety of fields, e.g., transparent display, security, and bioimaging. For example, the above-described dye-sensitized upconversion nanophosphors are applicable to display apparatuses, fluorescent contrast agents, anti-counterfeiting codes, etc.

Dye-sensitized nanophosphors according to various embodiments of the present invention have a core and shell structure, have a wide absorption band ranging from 650 nm to 850 nm, and are excited in a near-infrared region to emit visible light. The absorption band of the dye-sensitized upconversion nanophosphors ranging from 650 nm to 850 nm may be understood with reference to FIGS. 1, 3, 6, 9, 12, and 15 showing absorption characteristics based on wavelengths according to Embodiments 1, 4, 7, 10, 12, and 14.

Dye-sensitized upconversion nanophosphors according to embodiments of the present invention include an organic dye (e.g., $C_{45}H_{51}N_2NaO_8S_3$) having a wide and intense absorption band in an 800-nm region, and emit green, blue, and red light at a high intensity under 980-nm and 800-nm near-infrared light excitation. Specifically, the dye-sensitized upconversion nanophosphors include blue- and green-light-emitting $Li(Gd, Y)F_4$-based tetragonal and red-light-emitting $NaGdF_4$-based hexagonal dye-sensitized upconversion nanophosphors capable of increasing the photoluminescence intensity for blue, green, and red light by using the organic dye (e.g., $C_{45}H_{51}N_2NaO_8S_3$). All of the blue-, green-, and red-light-emitting upconversion nanophosphors may increase the photoluminescence intensity based on sensitization with the organic dye (e.g., $C_{45}H_{51}N_2NaO_8S_3$).

The present invention discloses core/shell tetragonal green- and blue-light-emitting upconversion nanophosphors and core/shell/shell red-light-emitting nanophosphors capable of increasing the photoluminescence intensity for green, blue, and red light under 800-nm infrared light excitation. The photoluminescence intensity for blue, green, and red light may be greatly increased by sensitizing the core/shell tetragonal Li(Gd, Y)F$_4$-based and core/shell/shell hexagonal NaGdF$_4$-based upconversion nanophosphors with a dye.

According to the present invention, upconversion nanophosphors for emitting green, blue, and red light under 980-nm and 800-nm infrared light excitation may be obtained. Dye-sensitized upconversion nanophosphors sensitized with an organic dye (e.g., $C_{45}H_{51}N_2NaO_8S_3$) having a wide and intense absorption band in an 800-nm region may emit light at a high intensity under 800-nm infrared light excitation. Since the dye-sensitized upconversion nanophosphors may have a very high photoluminescence intensity compared to existing core/shell and core/shell/shell upconversion nanophosphors, the dye-sensitized upconversion nanophosphors are expected to display bright images when used for 3D transparent display apparatuses and are expected to increase detection sensitivity when used for infrared detectors. In addition, when used for bio-imaging contrast agents, the dye-sensitized upconversion nanophosphors are expected to obtain intense image signals compared to conventional upconversion nanophosphors. However, the scope of the present invention is not limited to the above-described effects.

While the present invention has been particularly shown and described with reference to embodiments thereof, it will be understood by one of ordinary skill in the art that various changes in form and details may be made therein without departing from the scope of the invention as defined by the following claims. The embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A dye-sensitized upconversion nanophosphor, comprising:
    a core;
    a first shell surrounding at least part of the core; and
    an organic dye bonded to a surface of the nanophosphor which has an absorption band ranging from 650 nm to 850 nm and which is excited in a near-infrared region to emit visible light,
    wherein the core is made of a fluoride-based material co-doped with Yb$^{3+}$ and Er$^{3+}$ and expressed by Chemical Formula 1 below, $LiGd_xL_{1-x-y-z}F_4:Yb^{3+}{}_y,Er^{3+}{}_z$,   Chemical Formula 1 where x denotes a real number satisfying 0≤x≤0.6, y denotes a real number satisfying 0<y≤0.98, z denotes a real number satisfying 0<z≤0.2, 0<x+y+z≤1 is satisfied, and L denotes a rare-earth element selected from the group consisting of yttrium (Y), lanthanum (La), cerium (Ce), praseodymium (Pr), neodymium (Nd), promethium (Pm), samarium (Sm), europium (Eu), terbium (Tb), dysprosium (Dy), holmium (Ho), thulium (Tm), and lutetium (Lu), and a combination thereof, and
    wherein the first shell is made of a fluoride-based crystalline material co-doped with Nd$^{3+}$ and Yb$^{3+}$ and expressed by Chemical Formula 2 below, $LiY_{1-p-q-r}M_rF_4:Nd^{3+}{}_p,Yb^{3+}{}_q$,   Chemical Formula 2 where p denotes a real number satisfying 0<p≤1, q denotes a real number satisfying 0<q≤0.5, r denotes a real number satisfying 0≤r≤1, 0<p+q+r≤1 is satisfied, and M denotes an element selected from the group consisting of La, gadolinium (Gd), Ce, Pr, Pm, Sm, Eu, Tb, Dy, Ho, erbium (Er), Tm, Lu, and a combination thereof.

2. The dye-sensitized upconversion nanophosphor of claim 1, wherein the organic dye comprises $C_{45}H_{51}N_2NaO_8S_3$ which is an IR-808 dye.

3. A dye-sensitized upconversion nanophosphor, comprising:
    a core;
    a first shell surrounding at least part of the core; and
    an organic dye bonded to a surface of the nanophosphor which has an absorption band ranging from 650 nm to 850 nm and which is excited in a near-infrared region to emit visible light,
    wherein the core is made of a fluoride-based material co-doped with Yb$^{3+}$ and Tm$^{3+}$ and expressed by Chemical Formula 3 below, $LiGd_xN_{1-x-y-z}F_4:Yb^{3+}{}_y,Tm^{3+}{}_z$,   Chemical Formula 3 where x denotes a real number satisfying 0≤x≤0.6, y denotes a real number satisfying 0<y≤0.98, z denotes a real number satisfying 0<z≤0.2, 0<x+y+z≤1 is satisfied, and N denotes an element selected from the group consisting of Y, La, Ce, Pr, Nd, Pm, Sm, Eu, Tb, Dy, Ho, Er, Lu, and a combination thereof, and
    wherein the first shell is made of a fluoride-based crystalline material co-doped with Nd$^{3+}$ and Yb$^{3+}$ and expressed by Chemical Formula 4 below, $LiY_{1-p-q-r}Q_rF_4:Nd^{3+}{}_p,Yb^{3+}{}_q$,   Chemical Formula 4 where p denotes a real number satisfying 0<p≤1, q denotes a real number satisfying 0<q≤0.5, r denotes a real number satisfying 0≤r≤1, 0<p+q+r≤1 is satisfied, and Q denotes an element selected from the group consisting of La, Gd, Ce, Pr, Pm, Sm, Eu, Tb, Dy, Ho, Er, Tm, Lu, and a combination thereof.

4. The dye-sensitized upconversion nanophosphor of claim 3, wherein the organic dye comprises $C_{45}H_{51}N_2NaO_8S_3$, which is an IR-808 dye.

5. The dye-sensitized upconversion nanophosphor of claim 3, wherein the organic dye consists of $C_{45}H_{51}N_2NaO_8S_3$, which is an IR-808 dye.

6. A dye-sensitized upconversion nanophosphor, comprising:
    a core;
    a first shell surrounding at least part of the core; and
    an organic dye bonded to a surface of the nanophosphor which has an absorption band ranging from 650 nm to 850 nm and which is excited in a near-infrared region to emit visible light,
    wherein the core is made of a fluoride-based material co-doped with Yb$^{3+}$, Ho$^{3+}$, and Ce$^{3+}$ and expressed by Chemical Formula 5 below, $NaGd_{1-a-b-c-d}R_dF_4:Yb^{3+}{}_a,Ho^{3+}{}_b,Ce^{3+}{}_c$,   Chemical Formula 5 where "a" denotes a real number satisfying 0<a≤1, b denotes a real number satisfying 0<b≤0.2, c denotes a real number satisfying 0<c≤0.6, d denotes a real number satisfying 0≤d≤1, 0<a+b+c+d≤1 is satisfied, and R denotes an element selected from the group consisting of Y, La, Pr, Pm, Sm, Eu, Tb, Dy, Er, Tm, Lu, and a combination thereof, and where the first shell is made of a fluoride-based crystalline material co-doped with $Nd^{3+}$ and $Yb^{3+}$ and expressed by Chemical Formula 6 below, $$NaGd_{1-p-q-r}T_rF_4:Nd^{3+}{}_p,Yb^{3+}{}_q, \quad \text{Chemical Formula 6}$$

where p denotes a real number satisfying 0<p≤1, q denotes a real number satisfying 0<q≤0.5, r denotes a real number satisfying 0≤r≤1, 0<p+q+r≤1 is satisfied, and T denotes an element selected from the group consisting of Y, La, Ce, Pr, Pm, Sm, Eu, Tb, Dy, Ho, Er, Tm, Lu, and a combination thereof.

7. The dye-sensitized upconversion nanophosphor of claim 6, further comprising a second shell surrounding at least part of the core and the first shell,
wherein the second shell is made of a fluoride-based material expressed by Chemical Formula 7 below, $$NaGd_{1-p-q}X_qF_4:Nd^{3+}{}_p, \quad \text{Chemical Formula 7}$$

where p denotes a real number satisfying 0≤p≤1, q denotes a real number satisfying 0≤q≤1, 0≤p+q≤1 is satisfied, and X denotes an element selected from the group consisting of Y, La, Ce, Pr, Pm, Sm, Eu, Tb, Dy, Ho, Yb, Er, Tm, Lu, and a combination thereof.

8. A display apparatus, comprising a dye-sensitized upconversion nanophosphor including:
a core;
a first shell surrounding at least part of the core; and
an organic dye bonded to a surface of the nanophosphor which has an absorption band ranging from 650 nm to 850 nm and which is excited in a near-infrared region to emit visible light.

9. A fluorescent contrast agent comprising the dye-sensitized upconversion nanophosphor of claim 1.

10. An anti-counterfeiting code comprising the dye-sensitized upconversion nanophosphor of claim 1.

11. A display apparatus, comprising the dye-sensitized upconversion nanophosphor of claim 1.

12. A display apparatus comprising the dye-sensitized upconversion nanophosphor of claim 3.

13. A fluorescent contrast agent comprising the dye-sensitized upconversion nanophosphor of claim 3.

14. An anti-counterfeiting code comprising the dye-sensitized upconversion nanophosphor of claim 3.

15. A display apparatus comprising the dye-sensitized upconversion nanophosphor of claim 6.

16. A fluorescent contrast agent comprising the dye-sensitized upconversion nanophosphor of claim 6.

17. An anti-counterfeiting code comprising the dye-sensitized upconversion nanophosphor of claim 6.

* * * * *